United States Patent [19]

Stilley et al.

[11] 3,713,798

[45] Jan. 30, 1973

[54] METHOD OF PRESS SHAPING GLASS SHEETS

[75] Inventors: George W. Stilley, Freeport; William E. Wagner, Verona; Joseph D. Kelly, Cheswick, all of Pa.

[73] Assignee: PPG Industries, Inc., Pittsburgh, Pa.

[22] Filed: Jan. 6, 1971

[21] Appl. No.: 104,496

Related U.S. Application Data

[63] Continuation of Ser. No. 37,424, May 13, 1970, abandoned, which is a continuation of Ser. No. 672,738, Oct. 4, 1967, abandoned.

[52] U.S. Cl. ........................65/106, 65/273, 65/374
[51] Int. Cl. ..................................................C03b 23/02

[58] Field of Search....117/126 GQ, 5.1, 5.3; 65/106, 65/273, 287, 374, 275

[56] References Cited

UNITED STATES PATENTS 3,148,968　9/1964　Cypher et al. ..........................65/106
2,552,910　5/1951　Steinman......................117/126 GQ

*Primary Examiner*—Arthur D. Kellogg
*Attorney*—Chisholm & Spencer

[57] ABSTRACT

A method of bending glass sheets and an improved mold containing a specially treated cover of fiber glass fabric that contacts the hot glass during bending.

6 Claims, No Drawings

METHOD OF PRESS SHAPING GLASS SHEETS

RELATION TO OTHER APPLICATIONS

This application is a continuation of application Ser. No. 37,424 of George W. Stilley et al, filed May 13, 1970 for TREATING GLASS, which, in turn is a continuation of application Ser. No. 672,738 of George W. Stilley et al, filed Oct. 4, 1967 TREATING GLASS both now abandoned.

BACKGROUND OF THE INVENTION

One of the greatest frustrations in the mass production of bent glass sheets by a press bending operation involving the use of complementary shaping molds having fiber glass cloth covers is the time lost to replace the fiber glass covers whenever a cover becomes worn. It must be replaced as soon as the first sign of wear appears, or else the worn portion mars the optical properties of the shaped glass sheets and glass sheet breakage frequently results from directly exposing a localized portion of the glass to the exposed mold portion where the cover first begins to wear.

In press bending, glass sheets are first heated to a deformation temperature and then are engaged between a pair of glass shaping molds having complementary shaping surfaces conforming to the shape desired for the opposite major surfaces of the glass sheet after bending. The shaping molds are preferably covered with a stretchable knit fiber glass fabric composed of texturized yarns impregnated with an organic resin in order to prevent the heat-softened glass from coming into direct contact with the relatively rigid shaping members, because any slight blemish or variation from exact curvature desired that exists on the shaping surfaces of the shaping molds becomes obvious in the surface of the shaped glass. These blemishes disrupt the optical properties of the bent glass. The fiber glass fabric covers yield under pressure to reduce this tendency to cause defects and also provide one or more layers of thermal insulation material between each surface of the relatively hot glass undergoing shaping and the relatively cold shaping molds.

The fiber glass fabric covers tend to become worn when rubbed between the surfaces of the glass and the shaping surfaces of the mold, in such a way that abrasion occurs. U.S. Pat. No. 2,560,599 to Ryan suggests applying a layer of cellophane or the like to the shaping face of a form in order to prevent the shaping face of the form from adhering to the material used to impregnate layers of fiber glass fabric when the impregnated fiber glass fabric layers are laminated and cured to form either a shaping mold or a shaping face to be attached to a mold plate without any parting material between the mold and the cover.

THE PRESENT INVENTION

The present invention has demonstrated that the rate at which such covers wear and the frequency the worn covers have to be replaced can be reduced considerably by using a fiber glass fabric cover that has a sizing material for said fabric containing as an essential ingredient a Werner type complex organometallic compound of a salt of a monobasic acid and a polyvalent metal taken from the class consisting of chromium, cobalt, copper, lead and nickel, wherein said metal is coordinated with an acyclic carboxylic acido group having between one and twenty carbon atoms and mixtures of at least two of said Werner type complex organo-metallic compounds. A typical compound of this type and its preparation are described in U.S. Pat. No. 2,273,040, granted Feb. 17, 1942.

Such materials are available under the trade name of "Quilon" and "Volan" and have been used for many purposes altogether different from the art of press bending glass sheets.

The various coatings were applied by unrolling a roll containing a continuous web of fabric cover material of knit fiber glass and passing the web through a spray booth and a furnace on a roller conveyor and winding the web so treated on another roll to store for use as a mold cover. Some compositions were applied in both full strength and thinned with isopropanol to about 33 percent by volume.

Each coating composition was applied through an atomizing spray gun whose spray nozzle was maintained at an optimum distance of 3 inches above the plane of the fabric. The spray gun was reciprocated in a horizontal plane in a direction normal to the direction of movement for the web of fabric cover material. The rate of applying the coating compositions was varied to provide a rate of flow of from 10 to 50 cubic centimeters of coating composition per square foot of cover material. Optimum coating was determined to be 18 cubic centimeters of composition per square foot of cover material sprayed with the spray nozzle of the reciprocating spray gun moving in a plane located approximately 3 inches above the fabric cover material.

However, better migration of the coating composition through the fabric cover material was obtained by adding 2 parts by volume of isopropanol to 1 part of the coating composition. Under such circumstances, improved cover wear of 2 to 6 times the wear of untreated covers occurred when the compositions so thinned were applied at a rate of 100 to 200 cubic centimeters of thinned composition per yard of length of fabric. Since the fabric tested was 3 feet wide, this means a range of 11 to 22 cubic centimeters of thinned composition per square foot of fabric cover material treated.

Various coating compositions were tested by coating a knit fiber glass cloth cover material of textured yarn having the characteristics enumerated below. The amount of yarn texturizing is expressed as percentage overfeed of the individual yarns, as explained in U.S. Pat. No. 2,783,609, which teaches how to produce a looped bulk yarn characterized by loops of single filaments extending outward from the core of the yarn by feeding the yarn into a Venturi type nozzle operated by compressed air at a faster rate than its rate of withdrawal to permit fluffing or texturizing of the yarn.

Knit fiber glass cloth was knitted on a 16 gauge knitting machine (10 ⅔ needles per inch) to produce a 28 inch diameter tube of Jersey Stitch Weft Knit material with 20 courses per inch. The yarns are DE 75 ½ with about 10 percent overfeed. The cloth weighs about one pound per linear yard.

The average life of the untreated covers of the above material in terms of number of pressings obtained under production conditions before wear was observed was assigned a wear factor of 1. This was compared to the average life of covers made from the same material coated with one of the coating materials enumerated below.

The cloth was supplied to the plant in tubular rolls weighing about 55 to 60 pounds with the tube flattened to form a two layer continuous web wound about a supply roll. Each coating composition was applied by unwinding a roll and passing the continuous web of fiber glass cloth under a reciprocating spray gun where the coating composition was applied at room temperature at a rate sufficient to produce the coating composition desired. The sprayed web was then passed through a furnace 25 feet long maintained at a temperature of about 200 degrees Fahrenheit in about 3 minutes. This heat treatment baked the coating onto the fibers of the cover and removed the volatiles from the coating composition. The web so treated was wound about another roll and stored for use.

One cloth web had increments exposed to a 500° Fahrenheit atmosphere for about 20 minutes per increment. The web increments provided covers having a wear factor of 6 compared to 2 to 3 for the other treated covers and 1 for the untreated covers.

RELATIVE WEAR RATES OF PRESSING MOLD COVERS

| Treatment | Wear Factor |
| --- | --- |
| Untreated | 1 |
| Methacrylato chromic chloride ("Volan-A") (500°F.) | 6 |
| Metacrylato chromic chloride in 2 parts by volume of isopropanol | 3 |
| Stearato chromic chloride ("Quilon-S") | 3 |
| Stearato chromic chloride in 2 parts by volume of isopropanol | 3 |
| Chromic chloride Werner type complex coordinated with myristic acid ("Quilon-M") | 3 |
| Chromic chloride Werner type complex coordinated with Myristic acid in 2 parts by volume of isopropanol | 2 |

While the exact reason for the superior behavior of covers treated in the manner described hereinabove compared to untreated covers is not certain, it has been theorized that the sizing compositions react when the mold makes intermittent contact with a heated glass sheet to produce a thin coating of metal oxide on the fibers of the fabric cover by pyrolysis of the portion of the sizing composition consisting essentially of the Werner complex that is at or adjacent the surface of the cover that contacts the hot glass. The thin coating of metal oxide is believed to cooperate with the remaining sizing composition that does not react at the hot glass sheet surface to form a lubricant that lubricates the fibers of the fabric to prevent the fibers from wearing as rapidly as fibers of untreated cloth.

Fiber glass fabric received from the supplier contains a silicone binder. Additional experiments were performed to determine whether the binder was an important ingredient in the treated cover. In this experiment, one set of fiber glass rolls had the binder burned off before applying the sizing composition in the manner described above. The other set of fiber glass rolls were sprayed with the same sizing composition without any pre-treatment to remove the binder. There was no significant difference in mold cover life between the two sets of covers, although both sets of treated covers exhibited marked improvement in durability over untreated covers made from rolls containing the silicone binder as received.

While the particular materials shown in the table above increased the durability of the mold covers considerably, it is understood that many other complex salts of the Werner type of other metals besides chromium, such as cobalt, copper, lead and nickel, which are in the liquid state at normal room temperature or are soluble in various organic solvents, are also suitable. For example, the monobasic acids of the complex salts include the halogen acids, such as hydrofluoric acid, hydrochloric acid, hydrobromic acid and hydroiodic acid, as well as other monobasic acids such as nitric acid, formic acid, acetic acid and other monobasic carboxylic acids having from one through five carbon atoms in the carboxy group. The acyclic carboxylic acido group can be selected from those having between one and 20 carbon atoms which differ from the monobasic acid radical previously enumerated, and includes such carboxylic acido groups as the stearato group (derived from stearic acid), the palmitato group (palmitic acid), the myristato group (myristic acid), the laurato group (lauric acid), the oleato group (oleic acid), the caprato group (capric acid), the caprylato group (caprylic acid), the caprolato group (caproic acid), the valerato group (valeric acid), the butyrato group (butyric acid), the propionato group (propionic acid), the acetato group (acetic acid), and the formato group (formic acid) and and isomer or any aliphatic derivative of any of the above that has the desired properties mentioned above.

When it is desired to dissolve the complex salts recited above, any aliphatic, aromatic, polar or non-polar organic solvent that does not react chemically with the complex compound in the temperature range to which the cover material is subjected prior to press bending a heat-softened glass sheet is suitable. Suitable are alcohols, such as methanol, ethanol, benzyl alcohol, etc. in addition to isopropanol; ketones, such as acetone, methyl ethyl ketone, methyl isobutyl ketone, etc.; esters, such as ethyl acetate, butyl propionate, amyl butyrate, etc.; straight chain aliphatic hydrocarbons, such as hexane, octadecane, etc.; branch chain aliphatics such as iso-octane, 2-ethyl hexane, etc,; olefins such as penetene, heptene, decene, 2,4-pentadiene, etc.; aromatics, such as benzene, toluene, xylene, etc.; benzene derivates such as methyl benzene, dichlorobenzene, etc.; and others, such as diethyl ether, vinyl ether, etc.

Mixtures of two or more of the aforesaid Werner type complex salts that are compatible may be used as the essential ingredient of the sizing composition. In addition, two or more compatible solvents of the type enumerated above may be used to dissolve one or more complex salts that perform as the essential ingredient of the aforesaid sizing composition.

While the above description of various embodiments of the present invention has been included for purposes of illustration rather than limitation, it is understood that one skilled in the art may depart from the exact embodiments described without departing from the spirit of the present invention as recited in the claimed subject matter that follows.

We claim:

1. In a method of press bending heat-softened glass sheets under pressure against a mold member, the improvements which comprises interposing a fiber glass cover impregnated with about 10 to 50 cubic centimeters per square foot of a material selected from the group consisting of the Werner type complex organometallic compounds of a polyvalent metal selected from the group consisting of chromium, copper, cobalt, lead and nickel, in which the polyvalent metal is coordinated with an acyclic carboxylic acido group containing one to 20 carbon atoms and solutions of said Werner type complex organometallic compounds in organic solvents between said mold member and a sheet of heat-softened glass while the glass is at a temperature sufficiently high for deformation during said press-bending method, whereby said impregnated fiber glass cover is characterized by increased resistance to wear upon repeated, sequential exposure thereof to temperatures of the order in press bending heat-softened glass and ambient cool temperatures between press bending steps in said press-bending method.

2. An improvement as defined in claim 1, characterized in that said material comprises a Werner type chromium compound.

3. An improvement as defined in claim 2, characterized in that said Werner type chromium compound comprises a chromium chloride complex coordinated with a stearato group.

4. An improvement as defined in claim 2, characterized in that said Werner type chromium compound comprises a chromium chloride complex coordinated with a myristato group.

5. An improvement as defined in claim 2, characterized in that said Werner type chromium compound comprises a chromium chloride complex coordinated with a methacrylato group.

6. In a method of press-bending heat-softened glass sheets under pressure between a mold member provided with a shaping surface and another mold member provided with a shaping surface complementary to said first named shaping surface, the improvement which comprises interposing a fiber glass cover impregnated with a material selected from the group consisting of the Werner type complex organometallic compounds of a polyvalent metal selected from the group consisting of chromium, copper, cobalt, lead and nickel, in which the polyvalent metal is coordinated with an acyclic carboxylic acido group containing one to 20 carbon atoms and solutions of said Werner type complex organometallic compounds in organic solvents, between each of said shaping surfaces and the opposite major surfaces of a said sheet of glass while the latter is at a temperature sufficiently high for deformation during said press bending method, whereby said impregnated fiber glass cover is characterized by increased resistance to wear upon repeated, sequential exposure thereof to temperatures of the order in press bending heat-softened glass and ambient cool temperatures between press bending steps in said press-bending method.

* * * * *